Patented Nov. 16, 1948

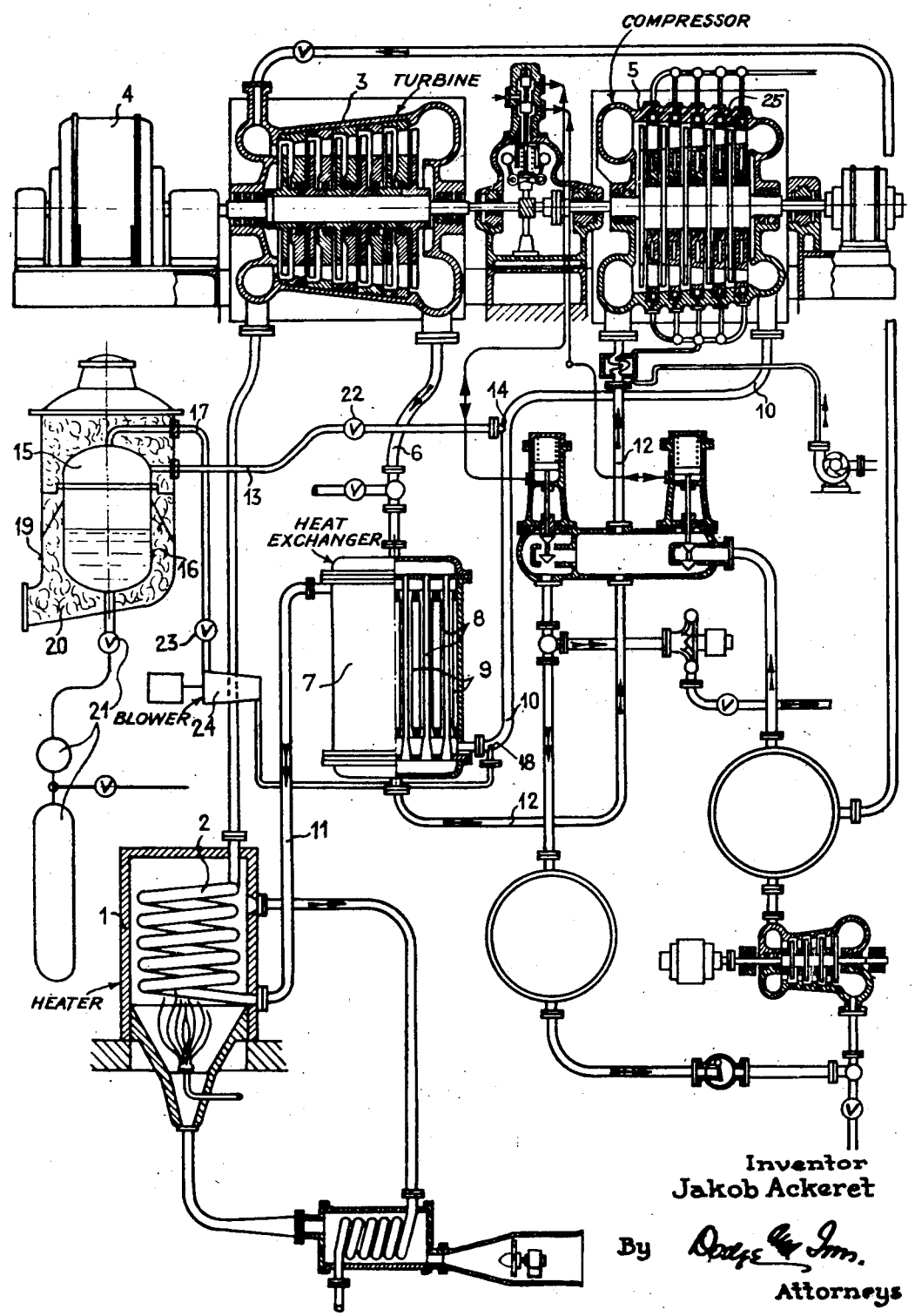

2,453,886

UNITED STATES PATENT OFFICE 2,453,886

THERMAL POWER PLANT AND ITS WORKING MEDIUM, WITH METHOD OF OPERATION

Jakob Ackeret, Kusnacht, near Zurich, Switzerland, assignor to Aktiengesellschaft Fuer Technische Studien, Zurich, Switzerland, a corporation of Switzerland Application August 31, 1944, Serial No. 552,071
In Switzerland October 11, 1943

6 Claims. (Cl. 60—59)

This invention relates to a working medium and a method of using the same for power generating purposes in thermal power plants in which the working medium describes a closed cycle, is heated by a supply of heat from an external source, then expanded in at least one turbine while giving up energy to at least one consumer of useful output, after which it is again raised to a higher pressure in at least one turbo-compressor, the expanded part of the current of working medium giving up heat in a heat exchanger to that part of the working medium which has been compressed but not yet heated by a supply of heat from an external source.

In such thermal power plants the kind of gas used as working medium has, in the first approximation, no influence on the efficiency, so that replacement of the working medium hitherto preferably employed, i. e. air, would hardly be considered with a view to improving the efficiency.

However, the theoretical efficiency of plants of the kind herein referred to, as calculated in the first approximation, cannot be attained in practice, since this would only be the case if the heat exchanging surfaces could be made of infinite size. Thus every surface of finite size impairs the efficiency, the latter becoming lower, the smaller the heat exchanging surface that is adopted. The nature of the gas has an influence which is such that by using a suitable kind of gas, for given pressure and temperature losses in the exchanger, a given surface is capable of transmitting much more heat. Thus when considered from this point of view the nature of the gas is not without influence on the efficiency.

Closer investigations have shown that when using lighter gases (of small atomic or molecular weight), for the same efficiency and same output of the plant, the dimensions of the heat exchanging surface can be very considerably reduced. Expressed in another way this means that when employing lighter gases as working medium the efficiency can be considerably increased, for the same output of the plant and the same dimensions of the heat exchanging surfaces.

As is known, the specific heat of a gas is dependent not only on the atomic or molecular weight, but also on the atomic number. As a consequence, in plants of the kind herein referred to the pressure ratios in the compressor and in the turbine are, for given temperatures, changed according to the nature of the working medium that is employed and this in such a manner that for monatomic gases the pressure ratio is smaller. This is inasmuch an advantage as a smaller number of stages can be adopted for compressor and turbine with the same molecular weight.

When considering these facts it is logical to employ light, monatomic gases as the working medium for plants of the kind herein referred to. As such gases, helium ($^4$He) and in certain circumstances neon ($^{20}$Ne) can be considered. The last mentioned gas is even lighter than air, but the difference is hardly sufficiently great to warrant the relatively expensive replacement. If only the lightness of the gas employed as working medium had to be considered, then hydrogen ($H_2$) and mixtures with other gases having hydrogen as basis could, of course, also be considered. However, hydrogen has undesirable properties as regards safe operation of the plant; for example it is inflammable and can have very detrimental effects on hot walls, for instance those of tubes.

Thus on the basis of present knowledge only the light monatomic helium can be considered as a suitable working medium in practice. However, pure helium involves the great disadvantage that, for a given temperature ratio for the compressor and especially for the turbine, a relatively large number of stages becomes necessary. It can be proved that when employing helium the number of stages (assuming the same peripheral velocity) must be approximately 5.4 times the number required when air is used as working medium. In order to overcome this drawback as far as possible without having to sacrifice the great advantage of the small molecular weight, according to the present invention a gas mixture with helium as basis and at least one further gas is employed as working medium for thermal power plants of the kind herein referred to, the average molecular weight of this gas mixture lying between minimum 5 and maximum 15, whilst its velocity of sound at normal temperature (i. e. 300° K, for example) amounts on the one hand to not more than 900 m./sec. and on the other to not less than 500 m./sec.

The use of such a gas mixture as working medium is of course contradictory to known proposals according to which light gases should not be employed as working medium, but on the contrary heavy, rare gases (see for example the British Patent No. 542,292), this with a view to maintaining the number of stages in turbine and compressor at a minimum. In this connection the fact has, however, been entirely overlooked that as a result of the high atomic weight of the particular rare gas, the efficiency of the heat exchanger, and consequently that of the whole thermal power plant, is, with given dimensions, lowered and that furthermore a high atomic or molecular weight of the working medium only makes a reduction in the number of stages possible when the velocity of sound of the particular medium lies sufficiently above the peripheral velocity of the turbo-machines. If this is not so, which is unavoidable in the case of the compressor, then the provision of a smaller number of stages leads to a considerable lowering of the compressor efficiency. Consequently the molecular weight and the velocity of sound of the working medium that is adopted, are by no means immaterial. This invention bases on the knowledge of the interdependence of these causes and involves on the one hand the technical improvement that the efficiency of thermal power plants becomes better for the same dimensions of the heat exchanger thanks to the small molecular weight of the mixture that is employed, whilst on the other hand the number of stages to be provided for the turbo-machines can, with full consideration of recent experience concerning the influence of the Mach number, be kept as small as possible.

To the helium, which forms the basis of the gas mixture, one or more of the following gases can, for instance, be added: air, nitrogen, heavy rare gases such as argon, carbonic acid. In choosing one or more of these additional gases considerations such as price, inflammability, poisonousness and the like are of decisive importance. The addition of atmospheric air has the advantage of cheapness; the addition of pure nitrogen when added to the basic helium results in a non-flammable mixture, whilst an addition of argon offers, for the same molecular weight, the advantages of monatomicity and higher velocity of sound.

A typical form of a thermal power plant in which a working medium according to this invention can be used, is illustrated in the accompanying drawing. In the figure reference 1 denotes a hearter, in which heat is supplied to the gas mixture describing a closed cycle at a pressure above atmospheric. This heater 1 represents the point at which heat from an external source is introduced into the cycle. The actual heating of the gas mixture is effected in a surface heat exchanger 2, around which the combustion gases flow. The gas mixture heated in this manner passes to a multi-stage gas turbine 3 of the axial flow type in which it expands, hereby giving up energy to a generator 4 and to a turbo-compressor 5 designed as a multi-stage axial flow compressor 5. The gas mixture issuing from the turbine 3 passes through piping 6 into a heat exchanger 7 designed as a counter current apparatus, in which it flows through a system of tubes 8, thereby giving up heat to that part of the working medium which flows through a system of tubes 9. Each tube of the system 8 is surrounded by a tube of the system 9. This latter system is connected by a piping 10 to the axial compressor 5 and by a piping 11 to the surface heat exchanger 2. The expanded gas mixture cooled in the heat exchanger 7 passes through a piping 12 into the turbo-compressor 5, wherein it is recompressed to a higher pressure whilst being cooled between the compressor stages. The intercoolers are indicated generally at 25. The gas mixture discharging from the turbo-compressor is forced through the piping 10 into the heat exchanger 7.

The regulation or governing of load fluctuations which arise in a plant of the kind described, is effected by changing the density of the working medium describing the closed cycle approximately proportionally to the momentary power given up externally by the turbine 3, the speeds of turbine 3 and compressor 5 being maintained unchanged. Accordingly, the pressure, and therefore the weight (in kg./sec.) of working medium flowing through the different points of the closed cycle is changed, the pressures at the different points of the cycle varying thereby approximately proportionally to the momentary power delivered externally by the turbine, whilst the heat drops and velocities of flow in the turbine 3 and compressor 5 remain practically unchanged. Such a method of regulation is described in the U. S. A. Patent No. 2,172,910, granted Sept. 12, 1939.

Reference 13 denotes a first section of a by-pass conduit branching off from the piping 10 beyond the compressor 5 at the point 14 and connecting to the space 15 of a vessel 16. To this space 15 is connected a second section 17 of said by-pass conduit. This second section 17 is also connected to the piping 10 at the point 18 situated in front of the heat exchanger 7. The vessel 16 is placed in a container 19 and to the space 20 left between the two parts 16, 19 is supplied a refrigerating medium, such as cooled brine or $CO_2$ snow.

21 denotes an emptying device provided at the lower end of the vessel 16, and 22 and 23 denote adjustable cut-off means inserted in the sections 13 and 17 respectively of the by-pass conduit. In the section 17 is also inserted a blower 24.

Let it be assumed that a mixture of helium and carbonic acid is used as working medium in the power plant just described. If now at any time the proportion of the carbonic acid contained in the mixture should be too great, for instance owing to an oversight during the filling of the cycle with working medium, or owing to greater leakage losses of helium and the like, then the cut-off means 22 and 23 are opened and at the same time a refrigerating medium is supplied in the space 20. In this connection it must be ensured that the temperature of this refrigerating medium is lower than the temperature at which the carbonic acid contained in the part of working medium flowing through the by-pass conduit 13, 17 separates in a liquid or solid state from the helium. The liquid or solid carbonic acid collecting at the bottom of the vessel 16 can be removed by means of the device 21 from the space 15 and thus from the cycle. The cut-off devices 22 and 23 are left in their open positions until such a quantity of carbonic acid has been extracted from the mixture circulating in the cycle as to ensure reestablishment of the required proportion between the helium and carbonic acid.

Thermal power plants of the kind herein referred to are frequently employed for driving power consumers which have to be cooled by means of gases, as for example electric generators. It is well known that in this connection advantages can be realised if light gases such as hydrogen and helium, are used as cooling means. For cooling the driven machine it is therefore very convenient to employ just such a gas mixture as that which is used according to the present invention as working medium for the thermal power plant itself. Mixtures of helium with nitrogen or carbonic acid are particularly suitable as cooling means for driven machines owing to the absence of oxygen.

What is claimed is:

1. A method of converting heat into work which comprises establishing a closed circuit charged with a gaseous working medium made up of helium and carbonic acid in such proportions that the average molecular weight of the mixture is more than 5 but less than 15, and its velocity of sound at normal temperature does not exceed 900 and is not less than 500 meters per second; heating said medium in one part of the circuit by supplying heat from an external source; then expanding the heated medium while giving up energy kinetically to at least one consumer of useful output; thereafter kinetically compressing the expanded medium; and removing excess $CO_2$ from the circuit by by-passing a part of the medium from and back to the circuit and subjecting the part being by-passed to a temperature sufficiently low to condense some of the $CO_2$, and withdrawing the condensed $CO_2$.

2. A method of converting heat into work which comprises establishing a closed circuit charged with a gaseous working medium having helium as a base and containing at least one other gas, the gases being present in such proportions that the average molecular weight of the mixture is more than 5 but less than 15, and its velocity of sound at normal temperature does not exceed 900 and is not less than 500 meters per second; heating said medium in one part of the circuit by supplying heat from an external source; then expanding the heated medium while giving up energy kinetically to at least one consumer of useful output; thereafter kinetically compressing the expanded medium; and causing the medium after said expansion to exchange heat with working medium after said compression and preparatory to supplying heat from an external source for the next cycle.

3. A method of converting heat into work which comprises establishing a closed circuit charged with a gaseous working medium including helium as a base, and at least one other gas selected from the group consisting of air, nitrogen, argon, carbonic acid, the gases being present in such proportions that the average molecular weight of the mixture is more than 5 but less than 15, and its velocity of sound at normal temperature does not exceed 900 and is not less than 500 meters per second; heating said medium in one part of the circuit by supplying heat from an external source; then expanding the heated medium while giving up energy kinetically to at least one consumer of useful output; thereafter kinetically compressing the expanded medium; and causing the medium after said expansion to exchange heat with working medium after said compression and preparatory to supplying heat from an external source, for the next cycle.

4. Thermal power plant, in which a working medium describes a closed cycle, comprising an external source of heat in which heat is supplied to the working medium; a prime mover of the turbine type in which the working medium thus heated up is allowed to expand whilst the prime mover delivers power externally; a compressor of the turbo type driven by said prime mover for compressing the expanded medium again to a higher pressure; and a heat exchanger in which the expanded part of the working medium issuing from the prime mover gives off heat to the re-compressed part of the working medium issuing from the compressor before heat is supplied to this re-compressed part; said working medium consisting of a gas mixture with helium as basis and at least one further gas, the average molecular weight of this gas mixture being more than 5 but less than 15 and its velocity of sound at normal temperature not exceeding 900 m./sec. and being not less than 500 m./sec.

5. Thermal power plant, in which a working medium describes a closed cycle, comprising an external source of heat in which heat is supplied to the working medium; a prime mover of the turbine type in which the working medium thus heated up is allowed to expand whilst the prime mover delivers power externally; a compressor of the turbo type driven by said prime mover for compressing the expanded medium again to a higher pressure; a heat exchanger in which the expanded part of the working medium issuing from the prime mover gives off heat to the re-compressed part of the working medium issuing from the compressor before heat is supplied to this re-compressed part; said working medium containing helium and carbonic acid in such proportions that the average molecular weight of this mixture is more than 5 but less than 15 and its velocity of sound at normal temperature does not exceed 900 m./sec. and is not less than 500 m./sec.; a conduit for by-passing a part of the working medium issuing from said compressor; adjustable cut-off means inserted in said by-pass conduit; and means for cooling the part of working medium flowing through said by-pass conduit below the point at which carbonic acid separates in a liquid or solid state from the helium.

6. Thermal power plant, in which a working medium describes a closed cycle, comprising an external source of heat in which heat is supplied to the working medium; a prime mover of the turbine type in which the working medium thus heated up is allowed to expand whilst the prime mover delivers power externally; a compressor of the turbo type driven by said prime mover for compressing the expanded medium again to a higher pressure; a heat exchanger in which the expanded part of the working medium issuing from the prime mover gives off heat to the re-compressed part of the working medium issuing from the compressor before heat is supplied to this re-compressed part; said working medium containing helium and carbonic acid in such proportions that the average molecular weight of this mixture is more than 5 but less than 15 and its velocity of sound at normal temperature does not exceed 900 m./sec. and is not less than 500 m./sec.; a conduit for by-passing a part of the working medium issuing from said compressor, said by-pass conduit being connected to the closed cycle at a point where the remaining re-compressed part of the working medium has not yet passed into said heat exchanger; adjustable cut-off means inserted in said by-pass conduit; means for cooling the part of working medium flowing through said by-pass conduit below the point at which carbonic acid separates in a liquid or solid state from the helium; and a blower for re-conveying said cooled, by-passed part of working medium into the main cycle.

JAKOB ACKERET.

REFERENCES CITED

The following references are of record in the file of this patent:

UNITED STATES PATENTS

| Number | Name | Date |
|---|---|---|
| 1,575,967 | Brodton | Mar. 9, 1926 |
| 1,703,408 | Smith | Feb. 26, 1929 |
| 1,882,809 | Grebe | Oct. 18, 1932 |
| 2,172,910 | Keller | Sept. 12, 1939 |
| 2,268,074 | Keller | Dec. 30, 1941 |